United States Patent [19]
Allen et al.

[11] Patent Number: 4,749,489
[45] Date of Patent: Jun. 7, 1988

[54] POLYPHOSPHAZENE SEMIPERMEABLE MEMBRANES

[75] Inventors: Charles A. Allen; Robert R. McCaffrey; Daniel G. Cummings; Alan E. Grey, all of Idaho Falls; Janine S. Jessup, Darlington; Richard E. McAtee, Idaho Falls, all of Id.

[73] Assignee: The United States of America as represented by the United States Department of Energy, Washington, D.C.

[21] Appl. No.: 868,478

[22] Filed: May 30, 1986

[51] Int. Cl.$^4$ .................... C02F 1/44; B01D 13/00
[52] U.S. Cl. ..................... 210/500.28; 210/500.21
[58] Field of Search ............. 210/500.28, 500.27, 210/500.21; 55/158

[56] References Cited

U.S. PATENT DOCUMENTS 4,710,204  12/1987  Kraus ........................... 55/16

FOREIGN PATENT DOCUMENTS

| | | | |
|---|---|---|---|
| 149988 | 7/1985 | European Pat. Off. | 210/500.28 |
| 150700 | 8/1985 | European Pat. Off. | 210/500.28 |
| 150699 | 8/1985 | European Pat. Off. | 210/500.28 |
| 59-154105 | 9/1984 | Japan | 210/500.28 |

OTHER PUBLICATIONS

Allock, H. R. "Phosphorus–Nitrogen Compounds–cyclic, Linear and High Polymeric Systems", Academic Press, N.Y., 1972, Chap. 16.
McAtee, R. E. et al., "The Synthesis and Casting of Phosphazene . . . " Abs. From Workshop of Phos. Chem., U.S. Naval Acad. Nov. 6–7, 1985, 1 page.
Allen, C. A. et al., "Polyphosphazene Membrane Research . . . ", Abs. From Workshop of Phos. Chem., U.S. Naval Acad., Nov. 6–7, 1985, 1 page.
Allcock, H. R. et al., "PHosphonitrilic Compounds . . . ", Inorganic Chemistry, 5, No. 10, Oct. 1966, p. 1709–1715.
Singler, R. E., et al., "Synthesis and Characterization of Polyacryloxyphozenes", J. of Poly. Science: Polymer Chem. Ed., vol. 12, 1974, p. 433–444.
Allcock, H. R. et al., "Phosphonitrile Compounds . . . ", Inorganic Chemistry, vol. 11, No. 11, 1972, p. 2584–2590.
Allcock, H. R. "Phosphazene High Polymers", Chemistry in Britain, vol. 10 (4), 1974, p. 118–121.
Allcock, H. R. "Poly(Organophospaazenes) . . . ", Angew. Chem. Int. Ep. Engl. vol. 16, 1977, p. 147–156.
Allock, H. R. "Inorganic Macromolecules", C+EN, vol. 63, No. 11, Mar. 18, 1985, p. 22–34.
Allen, C. A. et al. "Inorganic Membrane Techology", Abs., Northwest Am. Chem. Soc. Jun. 19–21, 1985, No. 139.
Allen, C. A. et al., "Inorganic Membrane Technology", Abs. From The Symp. On Sep. Science and Tech. For Engy. Appl., Oct. 20–24, 1985, p. 49.

Primary Examiner—Ernest G. Therkorn
Attorney, Agent, or Firm—James W. Weinberger; Thomas G. Anderson; Judson R. Hightower

[57] ABSTRACT

A semipermeable, inorganic membrane is disclosed; the membrane is prepared from a phosphazene polymer and, by the selective substitution of the constituent groups bound to the phosphorous in the polymer structure, the selective passage of fluid from a feedstream can be controlled. Resistance to high temperatures and harsh chemical environments is observed in the use of the phosphazene polymers as semipermeable membranes.

3 Claims, 3 Drawing Sheets

POLYPHOSPHAZENE SEMIPERMEABLE MEMBRANES

CONTRACTUAL ORIGIN OF THE INVENTION

The United States Government has rights in this invention pursuant to Contract No. DE-AC07-76ID01570 between The United States Department of Energy and EG&G Idaho, Inc., the operator of the Idaho National Engineering Laboratory.

BACKGROUND OF THE INVENTION

This invention relates to the separation of selected components of a fluid, and more specifically, a polyphosphazene membrane for the separation of selective components from a fluid feedstream.

The separations of organic and inorganic components from fluid mixtures such as dispersions, emulsions, solutions and the like has been accomplished in the past by various means, for example, distillation, filtration, solvent extraction and a combination of these and other methods. One efficient means for separation of dissimilar phases or components of a solution involves the use of semipermeable membranes. In general, prior art membranes have been prepared from organic polymers which are usually stable up to approximately 90° C. and are only effective in a limited range of media. As a result, the principle application of such prior art membranes has been in water desalination where the environment is relatively benign. Other potential uses such as petrochemical separations, in mineral processing, in catalytic reactions and in environmental clean-up, among a few, require use of a membrane in harsh environments, such as strongly caustic or acidic solutions or high temperature environments, and as such have yet to be considered as a significantly useful means for those chemical and physical separations involving such harsh environments.

Accordingly, an object of the subject invention is an improved inorganic membrane for the separation of various selected components from a feedstream fluid.

Another object of the subject invention is an improved inorganic membrane having superior flux and selective rejection characteristics over a broad range of temperature and environmental conditions.

Yet another object of the subject invention is a polyphosphazene membrane capable of being tailored for specific ion and/or solute rejection properties through the selective modification of side groups on the polymer chain.

BRIEF SUMMARY OF THE INVENTION

These and other objects are attained in accordance with the subject invention wherein there is provided an inorganic semipermeable membrane prepared from polyphosphazenes to yield a membrane with high temperature stability and high chemical resistance. The backbone of the linear polyphosphazene polymers comprises conjugated double bonds with alternating nitrogen and phosphorous atoms. The groups which are attached to each phosphorous atom may be easily modified and substituted with a variety of organic groups, generally alcohols, amines, or aromatic groups. When prepared in a thin film, a permeable membrane is formed, capable of selectively rejecting certain components and solutes and permitting other components to pass.

DETAILED DESCRIPTION OF THE PREFERRED EMBODIMENT

Figure 1:
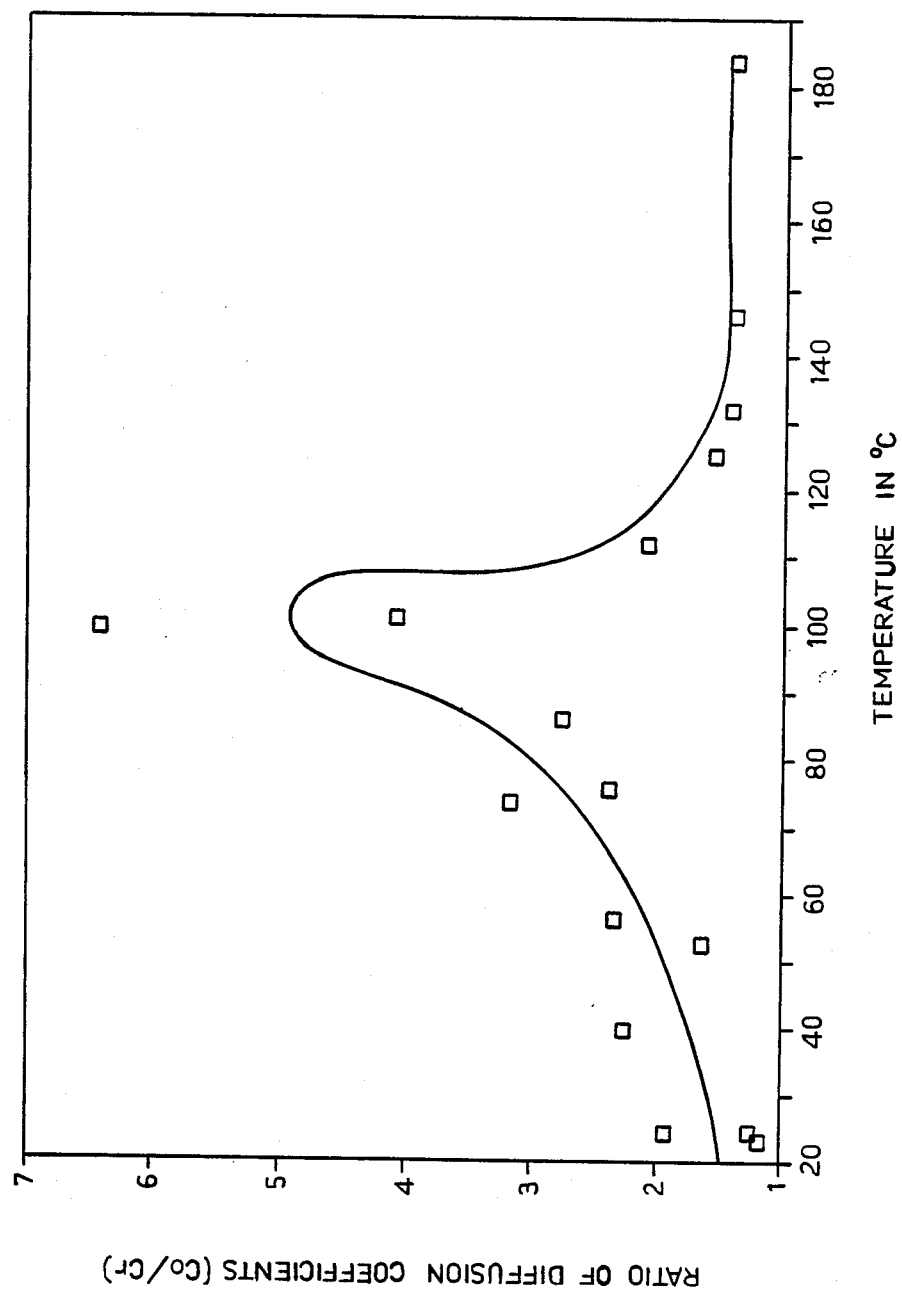
FIG. 1 is a graph showing the relationship of the Ratio of Diffusion coefficients (Co/Cr) of a membrane formed from poly[bis(phenoxy)phosphazene] with Temperature.

Polyphosphazenes are a polymeric material having an inorganic backbone comprising alternating nitrogen and phosphorous atoms which are in turn connected by alternating double bonds. Three basic polymer types can be prepared: linear, cyclolinear and cyclomatrix, as illustrated below:

Linear Phosphazene Polymer (I)

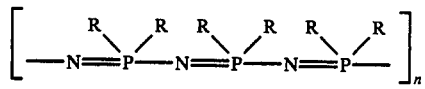

Cyclolinear Phosphazene Polymer (II)

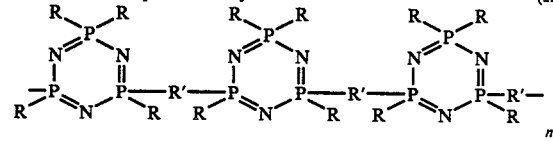

Cyclomatrix Phosphazene Polymer (III)

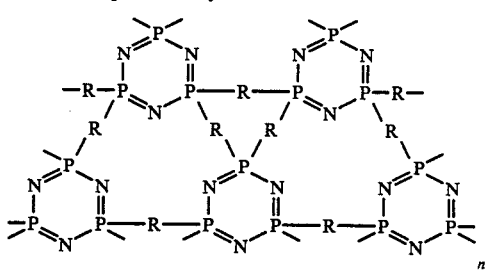

A base unsubstituted phosphazene polymer has two chlorine atoms attached to each phosphorous. These chlorines can be substituted by organic groups such as hydroxyl (R—OH), primary amine (R—NH$_2$), secondary amine (R$_2$—NH) or mercapto (R—SH) groups. In general, the polyphosphazene polymers for use in forming the membranes of the subject invention may be prepared using one of Allcock's procedures. H. R. Allcock, "Phosphorus-Nitrogen Compounds-Cyclic, Linear, and High Polymeric Systems," Academic Press, New York 1972, Chapter 16. Substituted polyphosphazene polymers may be derived from the cyclotrimer hexahalocyclotriphosphazene (usually the hexachlorotrimer is used). When heated to about 250° C., the trimer (hexachloro) polymerizes by a ring cleavage mechanism, to form the linear polydichlorophosphazene. A variety of side groups can be attached to the polymer by nucleophilic replacement of the halide side groups with alkoxy-, aryloxy-, amino- or thio-groups. Alkyl and aromatic groups can be attached to the polymer by the reaction of polydihalophosphazene with organometallic nucleophiles. In these reactions, the preferred substrate is polydifluorophosphazene. The cyclolinear and cyclomatrix polymers may be prepared by reacting the cyclic trimer with a difunctional monomer. The type of polymer obtained is dependent on the mole ratios of the reactants used and available reactive sites on the trimer. Such reactions are taught by Allcock and are well-known in the art. H. R. Allcock, "Phosphorus-Nitrogen Compounds-Cyclic, Linear, and High Polymeric Systems," Academic Press, New York 1972, Chapter 16, which teachings are incorporated herein in their entirety.

EXAMPLE 1

A variation of Allcock's procedure was used in the synthesis of poly[bis(2,2,2-trifluoroethoxy)phosphazene]; H. R. Allcock et al., *Inorganic Chemistry* 5, 1966, pg. 1709–1715. Instead of using stoichiometric amounts of the reactants as reported by Allcock a 20% mole excess of sodium and 50% mole excess of trifluoroethanol were used.

Hexachlorocyclotriphosphazene (45 g; 0.13 moles trimer; 0.78 moles chlorine) was polymerized for 48 hours at 250° C. in sealed evacuated glass tubes, according to Allcock's procedure. A sodium trifluoroethoxide solution was prepared by slowly reacting 21.4 g (0.931 moles; 120% mole) of sodium with 91 ml (1.164 moles; 150% mole) of trifluoroethanol in 120 ml of dry tetrahydrofuran while under a dry $N_2$ atmosphere. The polymerized material was dissolved in 225 ml of dry benzene and added dropwise, over 3 hours, to the tetrahydrofuran solution of sodium-trifluoroethoxide. The polymer mixture was refluxed for 40 hours under a dry $N_2$ atmosphere and upon cooling acidified with HCl to a pH of 4–5 to neutralize any unreacted base. The polymer mixture was then filtered and washed with water and ethanol to dissolve occluded sodium chloride. After the polymer was air dried it was dissolved in 300 ml of acetone and filtered to remove occluded salts (pressure filtration required). The polymer solution was then precipitated into 2–3 liters of water, filtered, and air dried. The polymer was purified with benzene or petroleum ether in a Soxhlet extractor for 48 hours (this extraction separated the oligomers from the polymer). Yields of 18–21% were obtained using this method.

Semipermeable membranes may be formed from polyphosphazenes using a variety of standard casting procedures such as dip casting, spin casting, knife casting, float casting, drum casting, phase inversion casting, thermal gelation, thermal molding, or compression casting. Of the casting methods identified above knife casting and spin casting were selected for initial studies of polyphosphazene membranes.

The knife casting apparatus used herein is an AO Reichart Microtome (Model 860) modified with a casting platform and a sage pump drive system for uniform movement of the knife assembly. A vacuum line was installed in the casting platform to hold the casting media in position. Knife height was set to the appropriate feeler gauge.

The procedure used to knife cast films is as follows: A clean nonporous or porous substrate dependent on the exact method used is positioned on the casting platform and leveled with respect to the knife blade using the platform leveling blocks. The knife height is set at a desired height above the substrate using the appropriate feeler gauge. The polymer solution is then poured on the substrate until it is flooded. The knife blade is swept across the substrate by engaging the sage pump drive system. After the substrate is swept with the knife, the sage pump drive system is disengaged and the solvent is allowed to evaporate resulting in a thin dry polymer membrane film.

The spin casting apparatus used in this study was a Clay-Adams Dynac variable speed benchtop centrifuge modified with a casting platform. Either support clamps or double sided adhesive tape is used to hold the casting media in position. The procedure used to spin cast films is as follows: A clean substrate is positioned on the casting platform and secured in place (either support clamps or double sided adhesive tape is used). The polymer solution is poured on the substrate until it is flooded. The centrifuge is then turned on to spin the casting platform at a set rotational speed (>100 rpm) for a desired amount of time (<10 seconds) until the centrifugal force thus generated results in the formation of a thin dry uniform polymer membrane.

Dip casting may also be used to form a membrane. The apparatus and procedure for doing so consists of a sage pump hydraulic dipping apparatus, substrate clamp, and polymer solution dipping tank. A clean substrate is lowered at a predetermined rate into the dipping tank which contains a phosphazene polymer solution at a predetermined concentration. After being completely immersed in the polymer solution, the substrate is slowly withdrawn from the dipping tank at a predetermined rate. The resulting thin polymer membrane film is allowed to dry by evaporation.

The trifluoroethoxyphosphazene polymer may be cast from pure solvent systems (i.e., ethyl acetate, tetrahydrofuran, or acetone), solvent mixtures, or solvent-/nonsolvent mixtures (nonsolvents are benzene, ethylene glycol, glycerol, or petroleum ether). The preferred solvent for use as the casting media in the formation of poly[bis(2,2,2-trifluoroethoxy)phosphazene] films on porous Inconel support plates was ethyl acetate. In general, the preferred solvent will vary as it is dependent on the particular phosphazene polymer being cast.

To test for diffusion or flux rate of the semipermeable membrane, gas and liquid test cells were designed and built to perform gas permeability tests up to 1000° C. and reverse osmosis and liquid diffusion tests up to 350° C.

The liquid membrane test cell and support systems used herein to evaluate the flux and integrity of the membranes were designed to accommodate liquids at temperatures up to 350° C. and pressures up to $2.07 \times 10^7$ Pa (3000 psi) with a pressure differential of up to $6.89 \times 10^6$ Pa (1000 psi) across the membrane/support plate. The system feed stream provided the feed solution to the membrane test cell at flow rates ranging from approximately 20 mL to over a liter/min. Flow was maintained with a constant displacement pump and controlled with downstream orifice valves. The feed solution was preheated to the test cell operating temperature and the cell rejectate was cooled before it reached the sample collection point. Rejectate flow was measured volumetrically. A microcomputer-based control and data acquisition system controlled fluid temperature and recorded temperatures and pressures throughout the system. A small diluent flow flushed the membrane permeate from the test cell to ensure that a steady state concentration was maintained on the permeate side of the membrane. Permeate diluent flow was measured volumetrically, and temperature and pressure were controlled and monitored as described for the feed solution stream. The feed and permeate piping system were constructed of Inconel to permit high temperature and pressure operation under wide pH range.

The test cell, enclosed in an isothermal chamber and constructed of Inconel, comprises two flanges with a membrane support plate sandwiched between. Cell temperature is constantly monitored and controlled. The membrane support plate is an Inconel plate into which a porous Inconel block is welded (in later designs disc was mounted using a thermal interference fit). The membrane is cast onto the support plate, which is sealed to the flange with Viton O-rings for low temperature measurements, and with silver coated C-rings for high temperature operation.

In liquid systems, the boundary layer at the membrane-solution interface directly affects the speed of transport through the membranes. A variety of techniques for reducing the boundary layer thickness have been evaluated, and include maintaining a flow rate sufficient to ensure turbulent flow, and introducing turbulence promoters at the membrane-solution interface.

To maintain the minimum boundary layer thickness, the test cell is thus designed to ensure turbulent flow. Feed solution is introduced into the cell in a parabolic chamber designed to provide a flow field of uniform velocity, and then into a square chamber containing the membrane. The chamber channel depth was sized to assure turbulent flow. The effective area for transport through the membrane was 6.5 cm². The permeate side of the membrane is designed similarly, and the permeate was continuously flushed from the cell.

System calibration and operation were checked at low temperature using commercial reverse osmosis membranes and a KCl solution. The measured selectivity data and permeate flux data agreed to within a few percent of the published data for the membranes.

EXAMPLES 2 AND 3

Membranes used in this example are made by the knife casting technique as set forth above. The first membrane is prepared from a solution of poly[bis(2,2,2-trifluoroethoxy)phosphazene] (PTFEP) in tetrahydrofuran, and the second membrane from the same polymer dissolved in ethyl acetate. Membranes are made from 1% solutions with knife heights of 100 μm. The resulting film thicknesses were 0.47 and 0.25 μm, respectively. Membrane thicknesses are determined gravimetrically and with scanning electron microscope (SEM) photographs. Such thicknesses could not be determined directly because the films could not be lifted intact off the support plate. Instead, an indirect method is used: replacing the support plate with glass slides, duplicating the membrane fabrication process, and gravimetrically determining the membrane thickness.

After the gravimetric measurements, the slides were broken to expose a cross section of the film, and SEM photographs were taken. The film edges on the photos were measured and, according for magnification, film thickness is determined. Thickness results for PTFEP in tetrahydrofuran and ethyl acetate are summarized in Table 1.

TABLE 1

| | | PTFEP Film Thicknesses | | | |
|---|---|---|---|---|---|
| | | Polymer | | Film Thickness | |
| Example | Solvent | Concentration | Knife Height | Gravimetric | SEM Photos |
| 2 | Tetrahydrofuran | 1% | 100 μm | 0.47 μm | |
| 3 | Ethyl Acetate | 1% | 100 μm | 0.27 ± 0.03 μm | 0.25 μm ± 0.09 μm |

Each membrane was tested for leaks prior to the diffusion test. The leak test comprises pressurizing the membrane feed side to $4.29 \times 10^5$ Pa (50 psig) with the feed solution and leaving the permeate side open to the atmosphere. If the solution appeared at the permeate side, the membrane was judged to be faulty (i.e., with holes). If no solution appeared at the permeate side, the membrane was considered to be intact. This test is performed before each run.

The diffusion experiments are performed by exposing the membrane (feed) side to a flowing solution of 0.1M mehanol+0.1M ethanol+0.1M isopropanol alcohol in water and the permeate side to a constant flow of demineralized water (conductivity 0.2 μs). Experimental runs at 100° C. and 122° C. also include 0.1M phenol as a diffusing species. In this manner a constant concentration gradient is established as a driving force for molecular movement across the membrane. To eliminate pressure effects, the pressure difference between the two sides is maintained at $6.87 \times 10^4$ Pa (8 psig). Based on the leak pressure differential of $4.92 \times 10^5$ Pa, the $6.87 \times 10^4$ Pa differential is an insufficient driving force for reverse osmosis.

A typical experimental run is conducted by first performing the leak test described earlier and then raising the pressure on both sides of the membrane simultaneously to the desired operating pressures. The fluids and membrane temperatures are then raised and stabilized. After waiting for 1½ hours to ensure at least one complete volume change of the permeable sample lines, the permeate, rejectate, and feed fluids are sampled at approximately one-hour intervals. Typical permeate flow rates were 1.0 ml/min and typical rejectate flow rates were 25 ml/min. During the sampling periods, usually 20 minutes, data is collected on flow, temperature, and pressure. The samples are labeled, refrigerated, and analyzed the following day.

The samples are analyzed by gas chromatography using syringe injection of the sample. A known standard is run to calibrate the instrument before the first sample run and after every 4 or 5 samples.

Test conditions ranged from 25° C. to 179° C. with feed pressures from $7.73 \times 10^5$ Pa to $1.8 \times 10^6$ Pa. Both membranes (Examples 3 and 4) are tested up to the point of membrane failure, although in both cases the failures were not catastrophic and resulted only in very small water leaks during differential pressure testing. Thus, 179° C. is not considered the absolute upper limit for the material.

Figure 2:
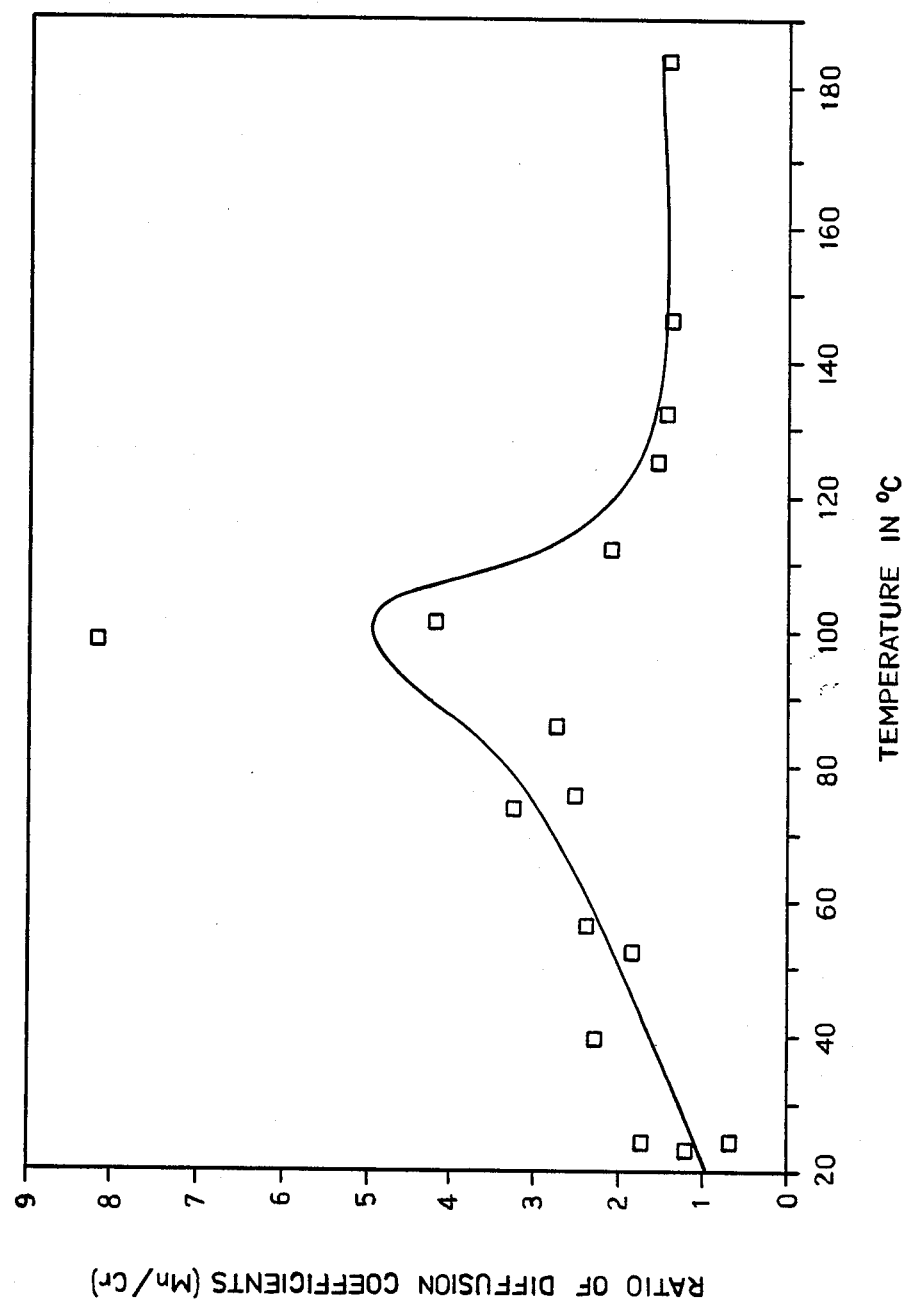
FIG. 2 is a graph showing the relationship of the Ratio of Diffusion Coefficients (Mn/Cr) of a membrane formed from poly[bis(phenoxy)phosphazene] with Temperature.
Figure 3:
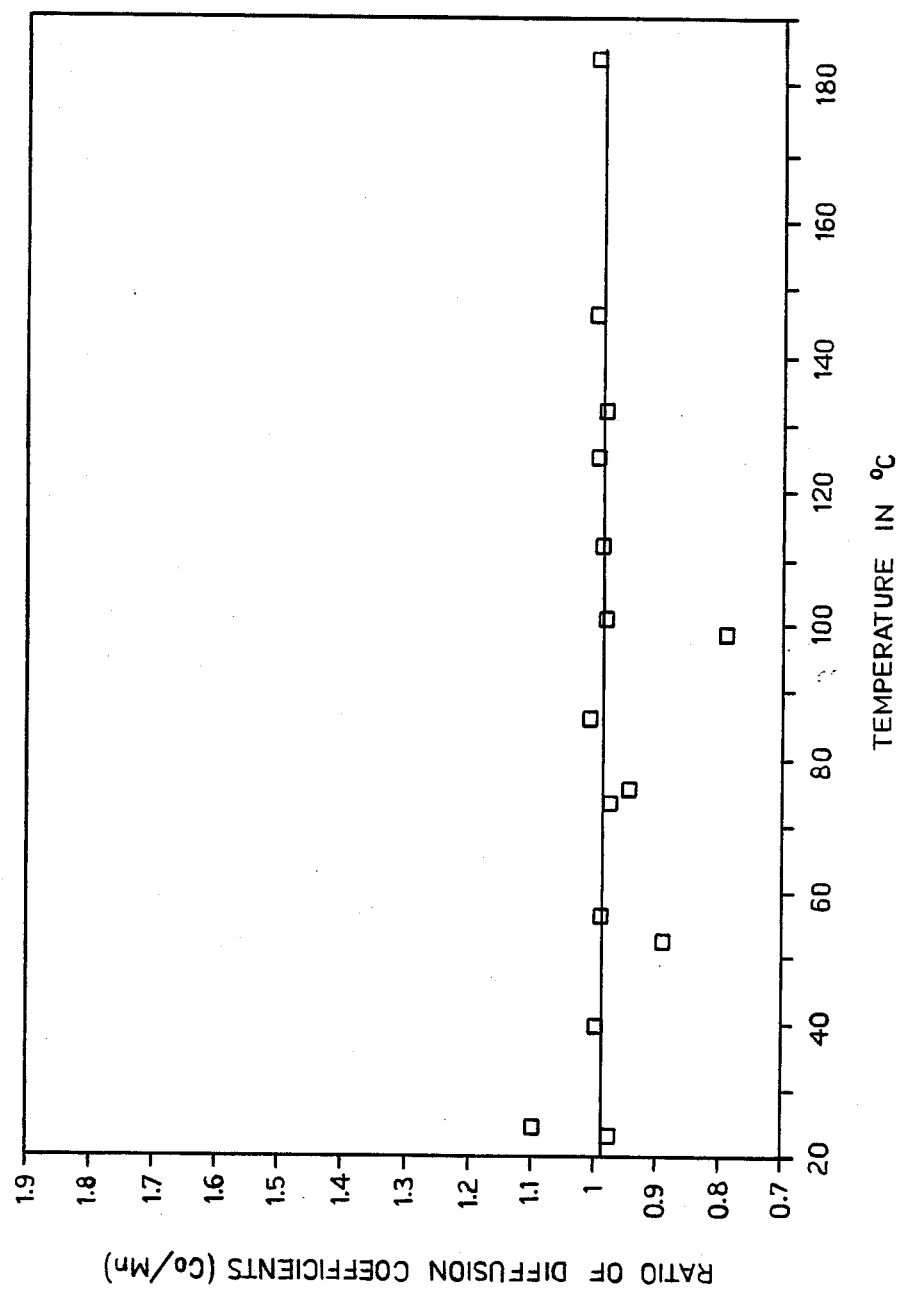
FIG. 3 is a graph showing the relationship of the Ratio of Diffusion Coefficients (Co/Mn) of a membrane formed from poly[bis(phenoxy)phosphazene] with Temperature.

The flux of methanol, ethanol, and isopropanol through a poly[bis(2,2,2-trifluoroethoxy)phosphazene] membrane are calculated using the permeate concentrations and flow. Diffusion coefficients are calculated using the feed or rejectate concentration, the membrane thickness, and flux. No difference in concentration is detected between the feed and rejectate. Results are shown in Tables 2 and 3 along with diffusion results for the 0.1M phenol included in Table 3.

nese ions and much less permeable to chromium ions. Results are shown in Table 4 and FIGS. 1, 2 and 3.

TABLE 2

AVERAGE DIFFUSION FLUX AND COEFFICIENT OF 0.47 μm PTFEP MEMBRANE

| Ave Temp (°C.) | Ave. Diffusion Flux - Fi (moles/cm²s) | | | Ave. Diffusion Coefficient-Di (cm²/s) | | |
|---|---|---|---|---|---|---|
| | Methanol | Ethanol | Isoprop. | Methanol | Ethanol | Isoprop. |
| 24.6 | 2.27E − 10 | 2.54E − 10 | 1.54E − 10 | 9.53E − 11 | 1.09E − 10 | 6.75E − 11 |
| 52.8 | 9.10E − 10 | 1.17E − 09 | 1.15E − 09 | 3.99E − 10 | 5.02E − 10 | 5.02E − 10 |
| 73.5 | 7.97E − 10 | 1.04E − 09 | 9.95E − 09 | 3.30E − 10 | 4.23E − 10 | 4.14E − 10 |
| 123.4 | 1.05E − 08 | 1.04E − 08 | 9.88E − 09 | 4.69E − 09 | 4.66E − 09 | 4.54E − 09 |
| 178.8 | 2.67E − 08 | 2.66E − 08 | 2.65E − 08 | 1.29E − 08 | 1.25E − 08 | 1.29E − 08 |

TABLE 3

AVERAGE DIFFUSION FLUX AND COEFFICIENT OF 0.25 μm PTFEP MEMBRANE

| Ave Temp (°C.) | Ave. Diffusion Flux - Fi (moles/cm²s) | | | | Ave. Diffusion Coefficient-Di (cm²/s) | | | |
|---|---|---|---|---|---|---|---|---|
| | Methanol | Ethanol | Isoprop. | Phenol | Methanol | Ethanol | Isoprop. | Phenol |
| 100.8 | 4.06E − 09 | 3.87E − 09 | 3.90E − 09 | 2.76E − 09 | 9.31E − 10 | 8.67E − 10 | 9.16E − 10 | 5.91E − 10 |
| 121.9 | 2.72E − 08 | 2.93E − 08 | 2.47E − 08 | 1.76E − 08 | 6.04E − 09 | 6.11E − 09 | 5.59E − 09 | 5.14E − 09 |

EXAMPLE 4

Singler's method was used in the synthesis of poly[bis(phenoxy)phosphazene]; R. E. Singler, et al., *J. of Polymer Science: Polymer Chemistry Edition* 12, 1974, pg. 433-444. 80 g of Hexachlorocyclotriphosphazene were polymerized at 250° C. for 48 hours in sealed evacuated glass tubes. A sodium phenoxide solution was prepared by slowly reacting 8.5 g (0.37 mole) of sodium with 38 g (0.40 mole) of phenol in a mixture of 100 ml of benzene and 110 ml of bis(2-ethoxyethyl)ether. The solution was allowed to react overnight in the dark while under dry $N_2$. The polymer, polydichlorophosphazene (80 g) was purified by dissolving it in 160 ml of benzene and precipitating into 800 ml of heptane. 20 g of the pure polydichlorophosphazene was immediately dissolved in 200 ml of dry benzene and slowly added dropwise, over one hour, to the benzene/bis(2-ethoxyethyl)ether solution of sodium phenoxide at 90° C. The polymer mixture was then refluxed at 110° C. with good stirring for 42 hours. After cooling, the polymer mixture was precipitated into 2 liters of methanol, filtered, washed with water and rinsed with methanol. The polymer was then twice dissolved in 1 liter of tetrahydrofuran, filtered, concentrated in a vacuum rotary evaporator (to approx. 150 ml), and finally precipitated into a ten-fold excess of water. The polymer was further purified using petroleum ether in a Soxhlet extractor for 48 hours. Yields of 50-60% were obtained using this method.

Membranes were formed of this compound using the knife casting and spin casting methods from tetrahydrofuran solutions. Each membrane was tested for leaks and then diffusion coefficients and flux rates determined as with Examples 2 and 3. Additional diffusion experiments were also performed by exposing the membrane (feed side) to a flowing solution of 0.01M $Co^{+2}$+0.01M $Mn^{+2}$+0.01M $Cr^{+3}$ (prepared from the corresponding metal nitrate) in water and the permeate side to a constant flow of demineralized water (conductivity 0.2 μs). Experiments were performed as with Examples 2 and 3.

The samples were analyzed by Atomic Absorption Spectrophotometry. A known standard was run for each metal to calibrate the instrument before the first sample run and after every 4 or 5 samples. The membrane was found to be permeable to cobalt and manga-

TABLE 4

| Average Diffusion Coefficient Ratio | | | |
|---|---|---|---|
| Co/Cr | Mn/Cr | Co/Mn | Temp (°C.) |
| 1.17E + 00 | 1.20E + 00 | 9.73E − 01 | 22.98 |
| 1.90E + 00 | 1.73E + 00 | 1.10E + 00 | 24.08 |
| 1.25E + 00 | 6.77E − 01 | 1.84E + 00 | 24.38 |
| 2.25E + 00 | 2.26E + 00 | 9.93E − 01 | 39.28 |
| 1.63E + 00 | 1.83E + 00 | 8.87E − 01 | 52.18 |
| 2.32E + 00 | 2.36E + 00 | 9.86E − 01 | 55.88 |
| 3.15E + 00 | 3.24E + 00 | 9.74E − 01 | 73.08 |
| 2.36E + 00 | 2.50E + 00 | 9.44E − 01 | 75.18 |
| 2.74E + 00 | 2.73E + 00 | 1.01E + 00 | 85.48 |
| 6.43E + 00 | 8.16E + 00 | 7.88E − 01 | 98.28 |
| 4.07E + 00 | 4.15E + 00 | 9.80E − 01 | 100.48 |
| 2.07E + 00 | 2.10E + 00 | 9.87E − 01 | 111.58 |
| 1.55E + 00 | 1.55E + 00 | 9.96E − 01 | 124.88 |
| 1.42E + 00 | 1.45E + 00 | 9.81E − 01 | 131.68 |
| 1.39E + 00 | 1.39E + 00 | 1.00E + 00 | 145.78 |
| 1.42E + 00 | 1.41E + 00 | 1.00E + 00 | 183.58 |

EXAMPLE 5

Poly[bis(butylamino)phosphazene] is prepared according to Allcock's method; H. R. Allcock, *Inorganic Chemistry* 11, 1972, pg. 2584-2590. Hexachlorocyclotriphosphazene (20 g, 0.17 mole) is polymerized at 250° C. for 48 hours in sealed evacuated glass tubes. The polymer, polydichlorophosphazene is dissolved in 600 ml of tetrahydrofuran and added dropwise to a tetrahydrofuran (900 ml) solution of n-butylamine (60 g, 0.83 mole) and triethylamine (22.9 g, 0.80 mole) with good stirring. The reaction mixture is stirred at 25° C. for 24 hours and then added to an excess of water to precipitate the polymer. The polymer is purified to remove salts and oligomers by repeatedly dissolving in 2,2,2-trifluoroethanol and precipitating into acetone. Yields of approximately 14% are obtained using this method.

A membrane is formed of this compound using the knife, spin, or dip casting method with a suitable solvent system (i.e., 2,2,2-trifluoroethanol). Each membrane is tested for leaks and then diffusion coefficients and flux rates determined as with Examples 2 and 3.

EXAMPLE 6

Poly[bis(diethylaminoorgano)phosphazene] is prepared according to Allcock's method; H. R. Allcock et al., *Inorganic Chemistry* 11, 1972, pg. 2584-2590. Poly[(- diethylamino organo)phosphazene] is a copolymer with two different substituent groups attached to each phosphorus. The synthesis proceeds in two steps. The diethylamino group is first attached to the polymer chain, followed by replacement of the remaining chlorine atoms with the desired organic group.

Polydichlorophosphazene (25 g, 0.22 moles) is prepared as in Example 5 and dissolved in 600 ml of tetrahydrofuran. The polydichlorophosphazene solution is slowly added to a stirred solution of diethylamino (164.3 g, 2.25 mole) in tetrahydrofuran (200 ml). The polymer mixture is stirred at 25° C. for 48 hours and then filtered to remove precipitated diethylamine hydrochloride. The polymer is isolated by precipitation of the filtrate into an excess of acetone. The polymer intermediate is then dried in a vacuum. About 50% of the available chlorine atoms are replaced in the intermediate polymer, poly[(diethylamino chloro)phosphazene].

The final polymer, Poly[(diethylaminoorgano)phosphazene], is prepared by replacement of the remaining chlorine atoms with alkoxy, aryloxy, or amino groups. Poly[(diethylamino alkoxy)phosphazenes] are formed following synthesis procedures similar to Example 1, but the sodium alkoxide is reacted with the intermediate, poly[(diethylamino chloro)phosphazene]. Poly[(diethylamino aryloxy)phosphazenes] are formed following synthesis procedures similar to Example 4, but the sodium aryloxide is reacted with the intermediate, poly[(diethylamino chlorophosphazene]. Poly(diethylamino amino)phosphazenes are formed following synthesis procedures similar to Example 5, but the appropriate alkylamine or arylamine is reacted with the intermediate, poly[(diethylamino chloro)phosphazene]. A membrane is formed of these compounds using the knife, spin, or dip casting method with a suitable solvent system (dependent on the copolymer formed). Each membrane is tested for leaks and then diffusion coefficients and flux rates determined as with Examples 2 and 3.

EXAMPLE 7

Cyclomatrix polymers can be formed by the reaction of cyclic phosphazene hexachlorotrimers or octachlorotetramers with difunctional groups such as diamines, diols, or mixtures of these compounds. The procedure followed in the synthesis of poly[hexabis(phenyl1,4-dioxy)cyclotriphosphazene] is similar to the one reported by Allcock; H. R. Allcock, "Phosphorus-Nitrogen Compounds—Cyclic, Linear, and High Polymeric Systems," Academic Press, New York 1972, Chapter 16.

Hexachlorocyclotriphosphazene (20 g, 0.057 mole), hydroquinone (19.7 g, 0.171 mole), and pyridine (13.6 g, 0.171 mole) are added to 200 ml of carbon tetrachloride. The mixture is refluxed (74° C.) for 4 hours with good stirring. When the mixture has cooled the carbon tetrachloride layer is decanted from the viscous oily yellow pre-polymer material. The pre-polymer is dissolved in 50 ml of butanol and then filtered to remove pyridinehydrochloride salts.

A membrane is formed of this pre-polymer material using the knife, spin, or dip casting methods. The pre-polymer film is cured at 200° C. for 48 hours to complete polymerization. The resulting polymer membrane film is a hard, insoluble, and thermally resistant material. Each membrane is tested for leaks and then diffusion coefficients and flux rates determined as with Examples 2 and 3.

EXAMPLE 8

Cyclolinear polyphosphazenes can be formed by the reaction of tetraorganodichlorocyclotriphosphazenes (cyclotrimers) or hexaorganodichlorocyclotetraphosphazenes (cyclotetramers) with difunctional groups such as diamines, diols or mixtures of such groups.

The tetraorgano substituted cyclotrimers and hexaorgano substituted cyclotetramers are formed by following procedures similar to Examples 1, 4 or 5, but where stoichiometric amounts of sodium alkoxides, sodium aryloxides, alkylamines, or arylamines are reacted with hexachlorocyclotriphosphazene or octachlorocyclotetraphosphazene to give the desired tetra or hexa organo-substituted cyclic phosphazene. The aim in this step is to replace all but two of the available chlorine atoms with organo-groups.

Once isolated the cyclic organo-intermediate can be crosslinked with diamines, diols or mixtures of to form the cyclolinear polyphosphazenes. Crosslinking synthesis procedures used are similar to Example 7.

Membranes can be formed of soluble film forming cyclolinear phosphazene polymers by knife, spin, dip, or other standard casting techniques described in Example 1, using a suitable solvent system. For insoluble film forming cyclolinear phosphazene polymer membranes casting methodologies similar to those described in Example 7 are used. Each membrane is tested for leaks and then diffusion coefficients and flux rates determined as with Examples 2 and 3.

The above examples and test results show a membrane can be prepared from phosphazene polymers, which can be selectively synthesized to have the capability of separating only desired solutes from a fluid. This capability is achieved through the substitution of various select groups on the phosphorus atom in the polymer structure. The resulting polyphosphazene is highly heat resistant as well as being chemically resistant. Thus, harsh environments, such as high or low pH, organic solvents and high temperatures will present only minimal deterrents to the use of polyphosphazene membranes in separation techniques.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The embodiments of this invention in which an exclusive property or privilege is claimed are defined as follows:

1. A semipermeable membrane for use in separating discrete components of an aqueous solution, said membrane being formed from a film-forming phosphazene polymer selected from the group consisting of cyclolinear phosphazene polymers and cyclomatrix phosphazene polymers.

2. A semipermeable membrane for use in separating discrete components of an aqueous solution, said membrane comprising a film-forming polyphosphazene of the formula:

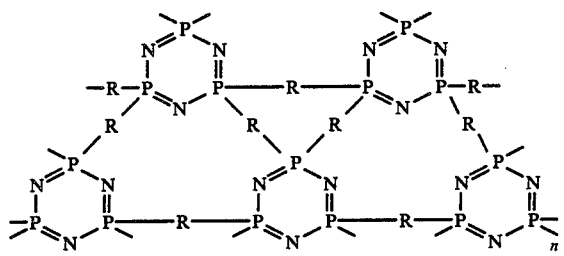

where R is selected from difunctional crosslinking groups consisting of aryloxy groups, alkoxy groups, primary amine groups and mercapto groups; and n is an integer greater than 1.

3. A semipermeable membrane for use in separating components of a liquid, said membrane comprising a film-forming polyphosphazene of the formula:

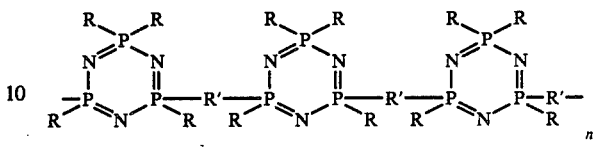

where the monofunctional side group R and the difunctional crosslink group R' are selected from the group consisting of alkyl groups, aryl groups, aryloxy groups, alkoxy groups, primary amine groups, secondary amine groups and mercapto groups; and n is an integer greater than 1.

* * * * *